United States Patent [19]
Goodrich et al.

[11] Patent Number: 5,651,519
[45] Date of Patent: Jul. 29, 1997

[54] ROBOT DRESS BAR

[76] Inventors: John J. Goodrich, 6360 Emerald Lake Dr., Troy, Mich. 48098; Charles Griffiths, 31 Intrepid Dr., Whitby, Canada, L1N 8S6

[21] Appl. No.: 403,636

[22] Filed: Mar. 14, 1995

[51] Int. Cl.⁶ ............................................. F16L 3/00
[52] U.S. Cl. .......................... 248/51; 248/56; 248/68.1; 248/74.1
[58] Field of Search .................... 248/51, 56, 57, 248/67.5, 68.1, 73, 74.1, 74.2, 74.3, 74.4

[56] References Cited

U.S. PATENT DOCUMENTS

| | | |
|---|---|---|
| 1,282,040 | 10/1918 | Bullock et al. . |
| 2,295,888 | 9/1942 | Bucknell et al. ................. 248/57 X |
| 2,813,692 | 11/1957 | Bremer et al. ......................... 248/56 |
| 3,684,223 | 8/1972 | Logsdon ............................ 248/74.3 |
| 3,778,537 | 12/1973 | Miller ............................. 248/74.2 X |
| 3,872,881 | 3/1975 | Miller et al. . |
| 4,076,272 | 2/1978 | Penton . |
| 4,377,301 | 3/1983 | Craig et al. ........................ 248/56 X |
| 4,582,281 | 4/1986 | Van Camp . |
| 4,595,162 | 6/1986 | Matsumura et al. ............. 248/67.5 X |
| 4,618,114 | 10/1986 | McFarland ..................... 248/74.2 X |
| 4,625,936 | 12/1986 | Hadden, Sr. ..................... 248/51 X |
| 4,705,243 | 11/1987 | Hartmann et al. . |
| 4,813,224 | 3/1989 | Blase . |
| 4,904,148 | 2/1990 | Larsson . |
| 4,938,440 | 7/1990 | Weinfield ..................... 248/206.5 X |
| 4,993,670 | 2/1991 | Tesar ............................. 248/909 X |
| 5,443,232 | 8/1995 | Kesinger et al. ................. 248/68.1 X |

*Primary Examiner*—Leslie A. Braun
*Assistant Examiner*—Anita M. King
*Attorney, Agent, or Firm*—Vanophem Meehan & Vanophem, P.C.

[57] ABSTRACT

A support device configured to support and enclose one or more supply lines, such as hoses, cables and leads, employed to deliver a fluid, gas or electrical power to an end-of-arm tool mounted to a robot. The support device is particularly suited for use with arc and spot welding robots and mechanical handling robots, which may require multiple fluid, gas and electrical lines. The support device is adapted to be mounted to a moving member of the robot, enabling supply lines to be safely routed along moving members from a suitable source to the end-of-arm tool. The support device serves to protect the lines from the working environment of the robot, and facilitates the repair and maintenance of the robot by permitting ready access to the lines. The lines can be correspondingly installed in segments, such that a limited segment of damaged line can be removed for repair or replacement, as opposed to the entire length of line being replaced.

19 Claims, 2 Drawing Sheets

ROBOT DRESS BAR

BACKGROUND OF THE INVENTION

1. Field of the Invention

The present invention generally relates to industrial robots and the fixtures and carrier assemblies used to route various supply lines along the moving members of a robot. More specifically, this invention relates to a dress bar with which fluid, air and/or current conducting lines can be routed on a robot to a tool mounted to the robot's wrist, wherein the fluid, air and/or current conducting lines can be routed through the dress bar so as to be protected from the operating environment of the robot, and such that installation, maintenance and service of the lines are simplified.

2. Description of the Prior Art

Industrial robots are widely employed for transferring workpieces between work stations and successive operations, to perform work at specific stations, and to manipulate tooling at work stations to obtain the proper tooling orientation for a particular operation. Their high reliability, precision, relatively low cost, and ability to be reprogrammed to tailor their operation to changing work conditions have resulted in robots being highly valued equipment for high volume manufacturing processes, such as in the automotive industry.

Among the many specific operations in which robots are employed, robots have found wide use in welding operations such as arc and spot welding. Such applications are generally unique for their requirement that the welding tool must be supplied with electrical power, a cooling fluid such as water, air or an inert gas to provide a proper welding atmosphere, a control signal to regulate the operation of the tool, and current for generating an electric arc or spot weld between the tool's electrode and a workpiece. In the past, the supply lines that carry the fluid, gas and electric power were often routed from a fixed location above or adjacent the robot, but only if the robot had a sufficiently limited work envelope. An example of this approach is taught by U.S. Pat. No. 4,582,281 to Van Camp, in which a flexible support and carrier assembly is used to physically support hoses and leads, as well as route the hoses and leads from a base adjacent the robot to a welding gun manipulated by a robot.

While such an approach may be adequate for welding robots having a relatively limited work envelope, for highly articulated robots and those having a large range of movement, the supply lines must typically be routed along the moving members of the robot arms, linkages and wrist. Under such circumstances, proper attention must be given to routing the supply lines along the moving members of the robot in order to ensure that they will not become tangled, snagged, pinched, cut, pulled or abraded during the operation of the robot.

Consequently, the prior art has also suggested various methods and fixturing for routing supply lines along the moving members of a robot, a process known as "dressing out a robot." One example is taught by U.S. Pat. No. 4,904,148 to Larsson, in which a flexible conduit composed of a number of supply lines is routed within the moving members of a robot. While such an approach is able to protect the supply lines from the working environment of the robot, such a technique complicates assembly of the robot and installation of the supply lines, and greatly impedes the ability to maintain and repair the supply line in the event of a failure.

A more conventional solution is taught by U.S. Pat. No. 4,705,243 to Hartmann et al., which teaches a technique for routing a bundle of hoses and leads along the exterior of the robot. The particular teachings of Hartmann et al. are directed to the use of casings which pivotably support the bundle at each axis of rotation of the robot. The casings are configured with a number of bores in which the individual hoses and leads are received and secured. The rotatable mounting of the casings enables the hoses and leads to rotate sufficiently to prevent them from being excessively bent during the operation of the robot.

While the teachings of Hartmann et al. provide certain advantages over the prior art, certain other disadvantages exist. For example, the bundle of hoses and leads is still exposed to the working environment of the robot, and is therefore vulnerable to being damaged by surrounding equipment, tooling or workpieces during operation, or from accidents that may occur during the setup and maintenance of the robot. The large bundle of loops that drape downwardly from the robot are particularly vulnerable to damage. Secondly, any damage to a hose or lead necessitates that the entire length of hose or lead be removed from the robot, which can often be in excess of ten meters. Therefore, there exists a significant potential for damage to a hose or lead, which directly causes production downtime and/or poor weld quality, and eventually necessitates the replacement of the entire length of damaged supply line.

From the above discussion, it can be readily appreciated that the prior art does not disclose a technique or the necessary equipment for routing the supply lines of an arc or spot weld robot in such a manner that the supply lines are protected from the robot's working environment, while simultaneously being configured to facilitate maintenance and repair of the robot and its supply lines. Accordingly, what is needed is a device for supporting one or more hoses and/or lines along the moving members of a robot, wherein the support device can be readily mounted on a robot, serves to protect the hoses and lines from the working environment of the robot, and facilitates the repair and maintenance of the robot by permitting ready access to the hoses and lines and by enabling the removal of a limited section of damaged hose or line.

SUMMARY OF THE INVENTION

According to the present invention there is provided a support device that is configured to support and enclose one or more supply lines, such as hoses and leads, employed to deliver a fluid, gas or electricity to end-of-arm tooling mounted to a robot wrist. The support device, referred to herein as a dress bar, is particularly suited for use with arc and spot welding robots, which may require multiple fluid, gas and electrical lines. The dress bar can be mounted to a moving member of the robot, enabling supply lines to be safely routed along the moving member from a suitable source to the end-of-arm tool. The dress bar serves to protect the lines from the working environment of the robot, and facilitates the repair and maintenance of the robot by permitting ready access to the lines. The lines can be correspondingly installed in segments, such that a limited segment of damaged line can be removed for repair or replacement, as opposed to the entire length of line being replaced.

The dress bar includes an elongate tubular member that defines a passage adapted to receive one or more supply lines for a tool mounted to a robot. Such lines may include hoses, leads or any other suitable conduit or cable for conducting a fluid, gas or electricity. The tubular member serves to protect the supply line from the operating environment of the robot. The tubular member has at least one end that is adapted to enable a terminal end of each supply line to project from the passage. Under most circumstances, both ends of the tubular member will be so adapted, and both terminal ends of each supply line will project from opposite ends of the passage.

The dress bar further includes a junction member secured to the tubular member so as to be axially disposed from an end of the tubular member. The junction member is adapted to receive, position and secure the terminal end of each supply line relative to the end of the tubular member. Preferably, the junction member has a planar portion equipped with a number of apertures, each of which is adapted to receive one of the terminal ends of the supply line. In addition, the planar portion is preferably pivotably mounted to the tubular member, so as to enable the planar portion to be articulated for proper orientation of the supply line relative to the end of the tubular member and relative to the end-of-arm tool.

Finally, the dress bar is equipped with a mounting device for securing the tubular member to a moving member of a robot. Secondary attachments for the dress bar include a second mounting device mounted directly to the tubular member for supporting a second supply line, such as a high voltage electrical line or a secondary spot weld cable, such that the second supply line is spaced apart from the tubular member.

According to a preferred aspect of this invention, the supply lines routed through the tubular member are shielded from the working environment of the robot, so as to significantly reduce the likelihood for the supply lines to be damaged during the operation of the robot. Only a limited portion of each supply line is exposed outside of the tubular member, and such portions are generally protected by being short segments securely suspended between the end of the tubular member and its junction member. A significant number of supply lines can be routed in this manner, while larger cables generally required to deliver the main welding power to a welding tool can be routed on the outside of the dress bars with the second mounting device.

Another significant advantage of the present invention is that the construction of the dress bar and junction member yields a support system that facilitates maintenance and repair of a robot's supply lines. For example, if a supply line fails at a point between the dress bar and the tool, only that portion of the supply line between the tool and junction member need be removed. Accordingly, only a short section of supply line is replaced, thereby minimizing the amount of downtime and materials required to complete the repair.

Accordingly, it is an object of the present invention to provide a support device for one or more supply lines, such as hoses and leads employed to deliver a fluid, gas or electricity to a tool mounted to a robot.

It is another object of the invention that the support device be configured to receive the supply lines in a manner which protects the supply lines from the working environment of the robot.

It is a further object of the invention that the support device be mountable to a moving member of the robot, such that the supply lines are routed along the moving member from a suitable source to the tool.

It is a further object of the invention that the support device be particularly suited for use with arc and spot welding robots, such that the support device is configured to carry multiple fluid, gas and electrical lines to the tool.

Other objects and advantages of this invention will be more apparent after a reading of the following detailed description taken in conjunction with the drawings provided.

DETAILED DESCRIPTION OF THE PREFERRED EMBODIMENT

Figure 1:
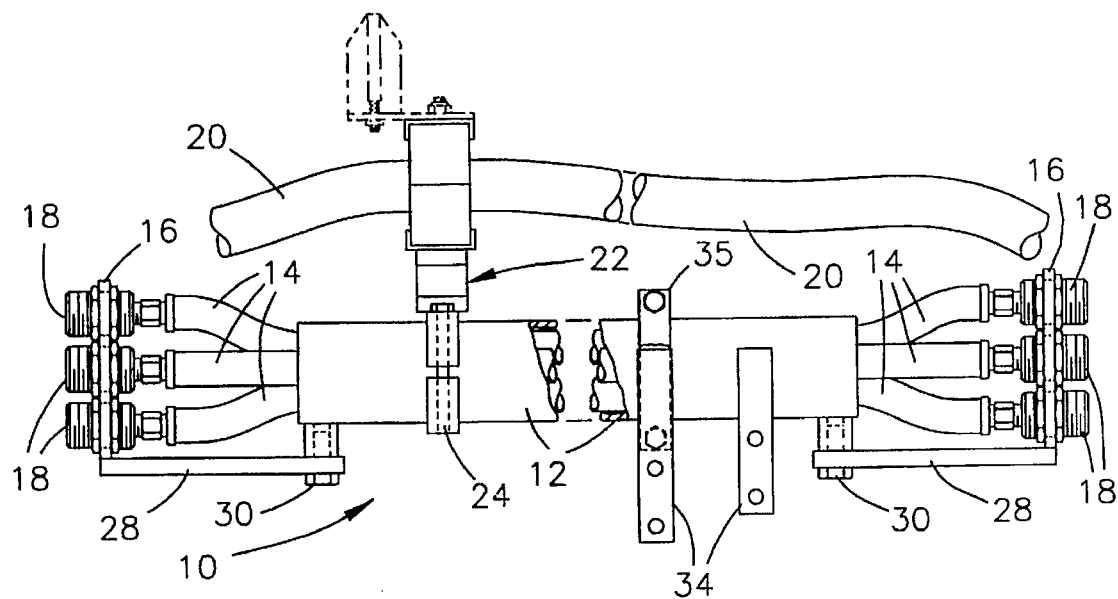
FIG. 1 is a side view of a dress bar for routing supply lines along a moving member of a robot in accordance with a preferred embodiment of this invention.

With reference to FIG. 1, there is shown a side view of a dress bar 10 in accordance with this invention. As illustrated, the dress bar 10 represents a support device for routing a number of supply lines 14 along a moving member of a robot (not shown). The dress bar 10 is particularly adapted to be employed in routing supply lines 14, such as fluid, gas and electrical lines, from a user plant supply system to a welding gun (not shown) or other end-of-arm tooling mounted to a robot. As is known in the art, fluid lines typically carry a cooling fluid, such as water, to and from the welding gun, and the gas lines typically carry a gas, such as air or an inert gas such as argon or helium, to the electrode of the welding gun. The current carrying lines routed through the dress bar 10 will typically be those employed to supply the operating power and control signals to the various portions of the welding gun. A main welding power cable 20, such as a low voltage, low reactive "kickless"-type cable or a 440 to 575 volt trans-gun power lead, may be routed outside of the dress bar 10, as shown.

The following description will specifically refer to the use of the present invention within the environment of a welding robot, though the teachings of this invention are not limited to such robots, and can be readily adapted by one skilled in the art to various robots and their diverse applications.

The dress bar 10 generally includes an elongate tubular member 12 and one or two junction plates 16. The dress bar 10 of FIG. 1 is shown equipped with a junction plate 16 at each end thereof, as would be the preferred construction for many applications. The tubular member 12 can be formed from any suitable material, including plastic or a metal such as steel or aluminum. The tubular member 12 preferably has a polygonal cross section, and more preferably a square or rectangular cross section for reasons to be noted below. In practice, suitable dimensions for the tubular member 12 include a length of about four feet (about 1.2 meters) and a width of about 2.5 inches (about six centimeters), though it is foreseeable that different dimensions would be used to accommodate differing requirements for a given application. The preferred size is able to accommodate up to nine ⅜ inch (about one centimeter) hoses plus a control signal cable. Though the tubular member 12 is shown as having a closed perimeter along its length, it is foreseeable that the tubular member 12 could be formed to have one or more slots extending along a portion or the full length thereof. However, any slots formed in the tubular member 12 must be sufficiently small so as to maintain adequate protection of the supply lines 14 routed therethrough.

Figure 2:
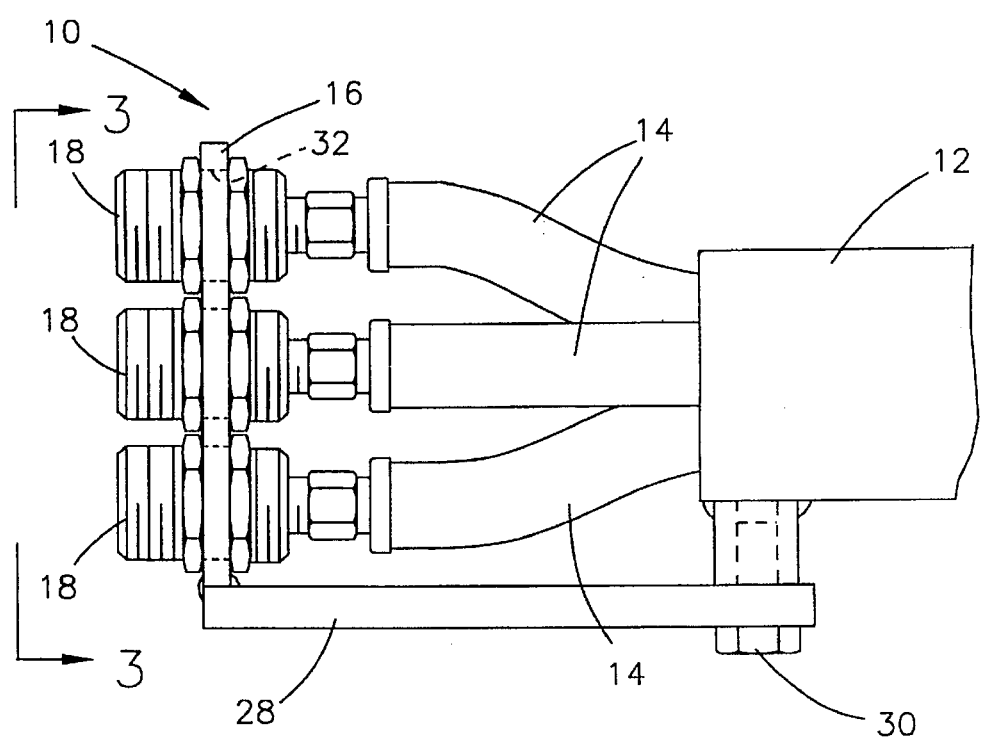
FIG. 2 is a detailed side view of one end of the dress bar of FIG. 1.
Figure 3:
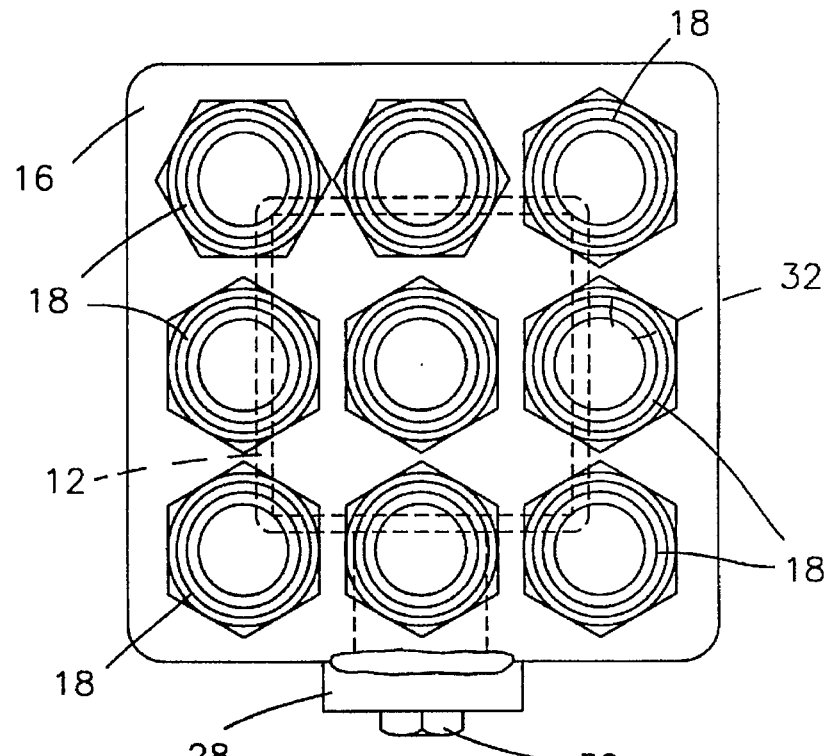
FIG. 3 is an end view of the dress bar of FIG. 2 taken along lines 3—3 thereof.

One of the junction plates 16 is illustrated in greater detail in FIGS. 2 and 3. Each junction plate 16 has a generally planar shape through which a number of apertures 32 extend. As shown, each junction plate 16 is secured to the tubular member 12 with a base 28 that is pivotably attached to the end of the tubular member 12 with a pivot bolt 30, such that the junction plate 16 can be articulated relative to the tubular member 12. As with the tubular member 12, the junction plates 16 and their bases 28 can be formed from any suitably rigid material, including metals and certain plastic materials. The apertures 32 are each sized to receive a bulkhead fitting 18 or other suitable interconnect component for each of the supply lines 14 shown in FIG. 1. As such, each supply line 14 can be readily and individually uncoupled and removed from the dress bar 10. Furthermore, each junction plate 16 can be pivoted to achieve an optimal interface between the supply lines 14 and each end of the dress bar 10.

Figure 4:
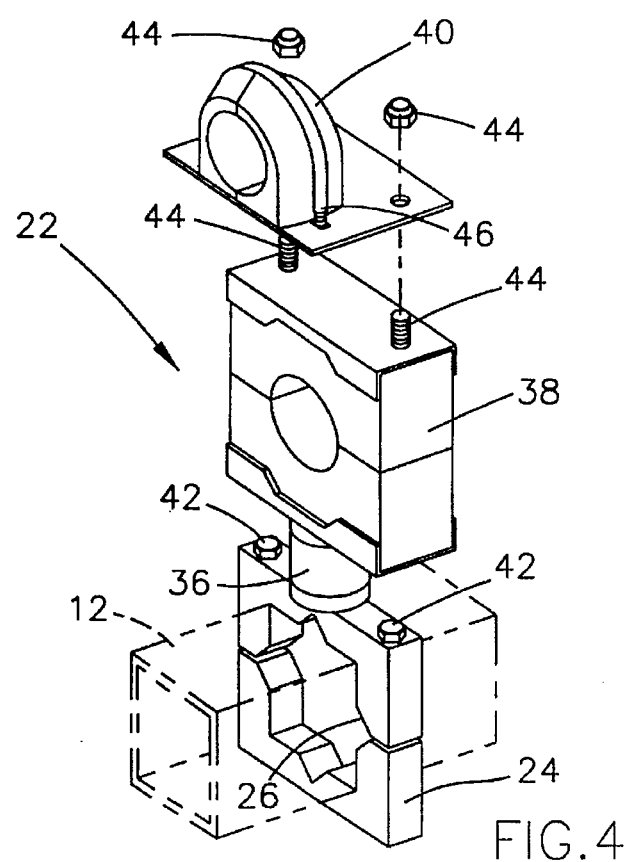
FIG. 4 is an exploded view of a stand-off bracket shown in FIG. 1.

The dress bar 10 preferably includes one or more standoff brackets 22. As shown in FIG. 1, the standoff bracket 22 can be used to support a cable, such as the main welding power cable 20 for the welding gun. A preferred construction for the standoff bracket 22 is illustrated in FIG. 4. As shown, the standoff bracket 22 includes a two-piece base 24 that defines an aperture 26. Secured to the base 24 with a mount 36 is a two-piece clamp 38 with which the cable 20 can be secured. Though not a necessary feature of this invention, the mount 36 is preferably adapted to enable the clamp 38 to rotate relative to the base 24 to allow the cable 20 to reorient itself relative to the dress bar 10 during the operation of the robot. A second clamp 40 may also be included to externally mount additional gas or water hoses to the dress bar 10, as may be desirable under certain conditions. Additional adjustable brackets may be desirable or required to handle specific or unique system requirements, such as status indicator lights, depending on the particular application.

The standoff bracket 22 is mounted to the tubular member 12 by first loosening or removing a pair of fasteners 42. The aperture 26 in the base 24 preferably has an eight-point polygonal shape, such that the standoff bracket 22 can be angularly oriented to the tubular member 12 in forty-five degree increments. Once properly positioned, the fasteners 42 are tightened to positively secure the standoff bracket 22 to the tubular member 12. The cable 20 can then be secured to the clamp 38 by positioning the cable 20 between the halves of the clamp 38, and then tightening a pair of fasteners 44 which secure the halves of the clamp 38 together. As illustrated, the second clamp 40 is secured to the clamp 38 with the fasteners 44, and tightened with a U-bolt 46.

In addition to the above, the dress bar 10 includes one or more universal mounting brackets 34 by which the dress bar 10 can be fastened to a moving member of the robot. The configuration and location of the mounting brackets 34 may depend on the type of robot, the shape and size of the moving member, and possibly the particular application. As such, the brackets 34 shown in FIG. 1 should be considered merely as illustrative and not a limitation to the scope of this invention. However, their construction preferably allows for right-hand or left-hand mounting on the dress bar 10. For this reason, one of the brackets 34 is shown to be mounted to the dress bar 10 with a two-piece base 35 that is essentially identical to the base 24 shown in FIG. 4 for the standoff bracket 22. The universal mounting bracket 34 is shown as being secured, such as with a weld, to one of the halves of the base 35. As with the base 24, the base 35 defines a polygonal aperture that enables the universal mounting bracket 34 to be angularly oriented on the tubular member 12, preferably in at least forty-five degree increments. Furthermore, the base 35 enables the dress bar 10 to be readily adjusted in a fore and aft manner on a moving member of a robot.

In use, once the dress bar 10 is appropriately mounted and positioned on a moving member of a robot, the supply lines 14 are inserted through one end of the dress bar 10 and routed through the tubular member 12 until they project from the opposite end. The supply lines 14 are sized to extend several inches from each end of the tubular member 12, so as to enable each end of each supply line 14 to be properly coupled to a corresponding bulkhead fitting 18 mounted to the junction plates 16. User plant supply lines (not shown) can be connected directly to the bulkhead fittings 18 on one side of one of the junction plates 16, and a short segment of lead or hose (not shown) can be secured and routed between the other junction plate 16 and a tool mounted on the robot wrist. The junction plates 16 can be articulated in order to achieve optimal entry and exit angles for the supply lines 14 relative to the tubular member 12, as well as an optimal orientation with the user plant supply lines and tool leads and hoses. Finally, cables and hoses can be routed externally of the dress bar 10 with the standoff bracket 22, as described previously.

In view of the above, it can be seen that a significant advantage of the dress bar 10 of the present invention is that by routing the supply lines 14 within the tubular member 12, the supply lines 14 are well protected from the operating environment of a robot. As a result, the likelihood for the supply lines 14 becoming damaged during the operation of the robot is significantly reduced. Only the ends of the supply lines 14 are exposed outside of the tubular member 12, and such portions are generally protected by being securely suspended between the end of the tubular member 12 and its associated junction plate 16. A number of supply lines 14 can be routed in this manner within the dress bar 10 of this invention, while larger cables generally required to deliver the main welding power to a welding tool can be routed on the outside of the dress bar 10 with the standoff bracket 22.

Another significant advantage of the present invention is that supply hoses and leads between the junction plate 16 and the robot end-of-arm tooling are relatively short. In the event that one of these short leads should fail, they can be readily removed and replaced. In contrast, prior art support devices have required that the entire length of supply line be replaced, which can be in excess of ten times the length between the junction plate 16 and the end-of-arm tool. Accordingly, the present invention enables the practice of removing and replacing only a short section of supply line, requiring minimal downtime and material cost to complete a repair.

In addition, the advantages of the dress bar 10 can be realized with minimal hardware, and can be readily adapted to mount to various robot configurations. Accordingly, the dress bar 10 of this invention is extremely versatile, and does not result in a significant penalty in terms of added weight.

Accordingly, the present invention provides a support device for one or more supply lines, such as hoses and leads employed to deliver a fluid, gas or electricity to a tool mounted to a robot. The support device, or dress bar, has an internal passage for receiving the supply lines, and thereby protects the supply lines from the working environment of the robot. Finally, the dress bar is particularly suited for use with arc and spot welding robots, and is configured to carry multiple fluid, gas and electrical lines to a welding gun or other end-of-arm tool.

While the invention has been described in terms of a preferred embodiment, it is apparent that other forms could be adopted by one skilled in the art. For example, numerous configurations for the standoff bracket 22 could be employed other than that shown in the figures. Additionally, the shape, size and configuration of the tubular member 12 and junction plates 16 could differ considerably from that shown. Accordingly, the scope of the invention is to be limited only by the following claims.

What is claimed is:

1. A device for supporting and protecting a supply line having a terminal end connected to a movable member of a robot, said support device comprising:

an elongate rigid tubular member defining a passage adapted to receive the supply line such that the supply line is protected from an operating environment of said robot, said rigid tubular member having an end for having the terminal end of the supply line projecting from said passage of said rigid tubular member;

junction means secured to and spaced from said rigid tubular member so as to be axially disposed and separated from said end of said rigid tubular member, said junction means being adapted to receive, position and secure the terminal end of the supply line relative to said end of said rigid tubular member; and means associated with said rigid tubular member for mounting said support device to said robot.

2. The device of claim 1 wherein said junction means comprises a planar member having a plurality of apertures therethrough.

3. The device of claim 1 further comprising pivotable means secured to said rigid tubular member for pivotably securing said junction means to said rigid tubular member.

4. The device of claim 1 wherein said rigid tubular member has a second end opposite said end of said rigid tubular member, said device comprising a second junction means secured to said rigid tubular member disposed separated from said second end of said rigid tubular member, said second junction means for receiving, positioning and securing a second terminal end of the supply line relative to said second end of said rigid tubular member.

5. The device of claim 1 further comprising means mounted to said rigid tubular member for supporting a second supply line spaced apart from said rigid tubular member.

6. The device of claim 5 wherein said support means is rotatably mounted to said rigid tubular member.

7. The device of claim 1 wherein said junction means comprises a bulkhead fitting for receiving and securing said terminal end of said supply line to said junction means.

8. A dress bar for protecting and supporting a plurality of supply lines to be connected to a movable member of a robot, said dress bar comprising:

an elongate stationary, rigid tubular member defining a passage adapted to receive at least two of the plurality of supply lines such that the at least two of the plurality of supply lines are protected from an operating environment of the robot, said rigid tubular member having an end for having a terminal end of each of the at least two supply lines of the plurality of supply lines projecting from said passage;

junction means secured to said rigid tubular member and axially displaced from said end of said rigid tubular member, said junction means being adapted to receive, position and secure the terminal ends of the at least two supply lines of the plurality of supply lines relative to each other and to said end of said rigid tubular member; and means associated with said rigid tubular member for mounting said dress bar to said robot.

9. The dress bar of claim 8 wherein said junction means comprises a planar member having a plurality of apertures therethrough, each aperture of said plurality of apertures adapted to receive an terminal end of the at least two supply lines of the plurality of supply lines.

10. The dress bar of claim 8 further comprising pivotable means secured to said rigid tubular member for pivotably securing said junction means to said rigid tubular member.

11. The dress bar of claim 8 wherein said rigid tubular member has a second end opposite said end of said rigid tubular member, said second end being adapted to enable a second terminal end of each of the at least two supply lines of the plurality of supply lines to project from said passage, said dress bar comprising a second junction means secured to said rigid tubular member and axially displaced from said second end of said rigid tubular member, said second junction means being adapted to receive, position and secure the second terminal ends of the at least two supply lines of the plurality of supply lines relative to each other and to said second end of said rigid tubular member.

12. The dress bar of claim 8 further comprising means mounted to said rigid tubular member for supporting a current carrying line such that said current carrying line is spaced apart from said rigid tubular member.

13. The dress bar of claim 12 wherein said support means is rotatably mounted to said rigid tubular member.

14. The dress bar of claim 12 wherein said support means comprises a base member for securing said support means to said rigid tubular member, said base member having an aperture therethrough, said rigid tubular member being received in said aperture.

15. The dress bar of claim 12 further comprising second support means mounted to said support means.

16. The dress bar of claim 8 wherein said mounting means comprises a base member for securing said mounting means to said rigid tubular member, said base member having an aperture therethrough, said rigid tubular member being received in said aperture.

17. The dress bar of claim 8 wherein said rigid tubular member has a square cross section, said dress bar further comprising:

means mounted to said rigid tubular member for supporting a current carrying line such that said current carrying line is spaced apart from said rigid tubular member;

a first base member for securing said support means to said rigid tubular member, said first base member having a first polygonal aperture therethrough to enable said rigid tubular member to be selectively angularly positioned within said first polygonal aperture and thereby enable said support means to be selectively angularly positioned about said rigid tubular member; and a second base member for securing said mounting means to said rigid tubular member, said second base member having a second polygonal aperture therethrough to enable said rigid tubular member to be selectively angularly positioned within said second polygonal aperture and thereby enable said rigid tubular member to be selectively angularly positioned about said movable member.

18. The dress bar of claim 8 wherein the junction means comprises a plurality of bulkhead fittings for receiving and securing the terminal ends of said at least two of said plurality of supply lines to said junction means.

19. A device for routing a plurality of supply lines for connection to a movable member of a robot, said device comprising a dress bar for protecting and supporting the plurality of supply lines, said dress bar comprising:

an elongate tubular member having a passage adapted to receive the plurality of supply lines such that the plurality of supply lines are protected from an operating environment of said robot, said tubular member having a first end and an oppositely disposed second end, said first and second ends each being adapted to enable first and second terminal ends, respectively, of each of the plurality of supply lines to project from said passage of said tubular member;

first junction means secured with respect to said first end of said tubular member, said first junction means being adapted to receive, position and secure the first terminal ends of the plurality of supply lines relative to each other and to said first end of said tubular member;

second junction means secured to said second end of said tubular member, said second junction means being adapted to receive, position and secure the second terminal ends of the plurality of supply lines relative to each other and to said second end of said tubular member;

means mounted to said tubular member for supporting a current carrying line such that said current carrying line is spaced apart from said tubular member;

a first base member for securing said support means to said tubular member, said first base member having a first aperture formed therethrough to enable said tubular member to be selectively angularly positioned within said aperture and thereby enable said support means to be selectively angularly positioned relative to said tubular member;

means associated with said tubular member for mounting said dress bar to said robot;

a second base member for securing said mounting means to said tubular member, said second base member having a second aperture therethrough to enable said tubular member to be selectively angularly positioned within said second polygonal aperture and thereby enable said tubular member to be selectively angularly positioned relative to said movable member;

wherein each of said first and second junction means comprises:

a planar member having a plurality of apertures therethrough;

fittings received in each of said plurality of apertures for receiving a corresponding terminal end of said first and second terminal ends of the plurality of supply lines; and pivotable means secured to said tubular member for pivotably securing said planar member to said tubular member.

* * * * *

UNITED STATES PATENT AND TRADEMARK OFFICE
CERTIFICATE OF CORRECTION

PATENT NO. : 5,651,519
DATED : July 29, 1997
INVENTOR(S) : John J. Goodrich, Charles J. Griffiths It is certified that error appears in the above-identified patent and that said Letters Patent is hereby corrected as shown below:

Column 7, line 34, after "member" insert ---- and ---- .

Column 7, line 51, after "elongate" insert ----, ----.

Column 8, line 62, delete "the", (second occurrence).

Column 8, line 64, delete "said" (first occurrence), insert ---- the ----.

Column 8, line 64, delete "said" (second occurrence), insert ---- the ----.

Column 8, line 65, delete "said", insert ---- the ----.

Signed and Sealed this

Seventeenth Day of March, 1998

Attest:

BRUCE LEHMAN

*Attesting Officer*     *Commissioner of Patents and Trademarks*